United States Patent [19]

Sano

[11] Patent Number: 5,739,924
[45] Date of Patent: Apr. 14, 1998

[54] PHOTOGRAPHED IMAGE PRINTING APPARATUS CAPABLE OF CORRECTING IMAGE QUALITY

[75] Inventor: Homare Sano, Sagamihara, Japan

[73] Assignee: Minolta Co., Ltd., Osaka, Japan

[21] Appl. No.: 346,755

[22] Filed: Nov. 30, 1994

[30] Foreign Application Priority Data

Dec. 9, 1993 [JP] Japan ............ 5-309356

[51] Int. Cl.$^6$ ............ H04N 1/46; G03F 3/08
[52] U.S. Cl. ............ 358/487; 358/506; 358/514; 358/517; 358/523
[58] Field of Search ............ 358/527, 515, 358/518, 487, 296, 448, 506, 523, 524, 444, 514, 517; 354/106, 110

[56] References Cited

U.S. PATENT DOCUMENTS

| | | | |
|---|---|---|---|
| 4,079,388 | 3/1978 | Takahama et al. | 354/31 |
| 5,128,711 | 7/1992 | Terashita et al. | 354/106 |
| 5,134,434 | 7/1992 | Inoue et al. | 354/430 |
| 5,157,506 | 10/1992 | Hannah | 358/298 |
| 5,319,401 | 6/1994 | Hicks | 354/106 |
| 5,319,403 | 6/1994 | Sakamoto | 354/106 |
| 5,321,452 | 6/1994 | Tsujimoto | 354/106 |
| 5,333,113 | 7/1994 | Cloutier et al. | 354/106 |
| 5,335,072 | 8/1994 | Tanaka et al. | 348/232 |
| 5,344,730 | 9/1994 | Kitamoto | 354/106 |
| 5,365,290 | 11/1994 | Suzuki et al. | 354/106 |
| 5,376,484 | 12/1994 | Iwagaki | 354/106 |
| 5,420,699 | 5/1995 | Yamanouchi et al. | 358/487 |
| 5,432,571 | 7/1995 | Aoki et al. | 354/106 |
| 5,455,648 | 10/1995 | Kazumi | 354/106 |
| 5,461,439 | 10/1995 | Minakuti et al. | 354/106 |
| 5,461,440 | 10/1995 | Toyoda | 354/106 |
| 5,475,455 | 12/1995 | Hibino et al. | 354/106 |
| 5,479,228 | 12/1995 | Tamamura et al. | 354/106 |

*Primary Examiner*—Edward L. Coles, Sr.
*Assistant Examiner*—Fan Lee
*Attorney, Agent, or Firm*—Sidley & Austin

[57] ABSTRACT

A photographed Image printing apparatus includes an image sensor operable to optically read a photographed image on a recording medium; an information reader operable to read photographic information on the recording medium, the photographic information indicative of photographing conditions of the photographed image; an image quality correction manager in responsive to the information reader and operable to judge based on the read photographic information whether image quality correction is necessary, and determine a proper image quality correction, if necessary; an image corrector in responsive to the image quality correction manager and operable to correct the read photographed image in accordance with the determined image quality correction; and a printer operable to print a corrected image on a printing medium.

32 Claims, 7 Drawing Sheets

PHOTOGRAPHED IMAGE PRINTING APPARATUS CAPABLE OF CORRECTING IMAGE QUALITY

BACKGROUND OF THE INVENTION

This invention relates to a printing apparatus for printing on a printing sheet photographed images in a film.

Printing apparatuses have been known which automatically feed a developed film to pick up a photographed image recorded in each frame of the film and print a picked up image on a printing sheet. Also, an apparatus has been known which can read trimming information recorded on the developed film in correspondence with respective frames and applying a predetermined trimming to picked up images in accordance with the read trimming information (Japanese Unexamined Patent Publication No. 5-100323).

The trimming information relates to the size of a print image, for example, an L-size, a panorama size, and a cinema size. In the above printing apparatus, the picked up image is processed into an image of a print size designated by the print information, and thus automatically printed in the predetermined print size.

For instance, if the trimming information of an image to be printed denotes the panorama size, the corresponding picked up image is processed into a panoramic image, e.g., only a vertically center portion of an image region being extracted, and the thus obtained image is printed on a printing sheet of the panorama size.

The trimming information is, for example, magnetically recorded on a magnetic recording section provided outside a photographed image recordable region of the film. On this magnetic recording section are recordable not only the trimming information, but also a variety of photographic information concerning a photographing date, a photographing distance, exposure control values (aperture value and shutter speed) and information concerning whether or not a flash device has been fired (flash firing information).

If a specified image quality correction can be applied to the picked up images in accordance with the photographic information during the image processing, the image quality can be improved during the printing operation, making it possible to obtain a better print image. For instance, when a photographed image is not sharply in focus, a specified correction may be applied to the photographed image to emphasize an outline of an image in accordance with the recorded photographic information thereof, so that the print image will be clearer.

The above printing apparatus is capable of automatically setting the size of print image in accordance with the trimming information recorded on the developed film, but is not capable of applying an image quality correction to the picked up images in accordance with the photographic information.

Further, the above-mentioned publication neither disclose nor indicate the art relating to the image quality correction.

SUMMARY OF THE INVENTION

It is an object of the present invention to provide a photographed image printing apparatus which has overcome the above-mentioned drawbacks.

It is another object of the present invention to provide a photographed image printing apparatus which can obtain a print image of improved quality by applying a specified image processing to a picked up photographed image in accordance with photographic information.

The present invention is directed to an image printing apparatus comprising: an image sensor operable to optically read a photographed image on a recording medium; an information reader operable to read photographic information on the recording medium, the photographic information indicative of photographing conditions of the photographed image; an image quality correction manager in responsive to the information reader and operable to judge based on the read photographic information whether image quality correction is necessary, and determine a proper image quality correction, if necessary; an image corrector in responsive to the image quality correction manager and operable to correct the read photographed image in accordance with the determined image quality correction; and a printer operable to print a corrected image on a printing medium.

The image quality correction manager may determine an outline emphasizing correction of emphasizing the outline of a subject if the photographing distance is judged to be greater than a predetermined distance, e.g., two meters. Also, the predetermined distance may be set at a shorter distance in the case of exposure control value for a lower subject brightness. The outline emphasizing correction may be executed by means of Laplacian calculation. Also, the image quality correction manager may determine the outline emphasizing correction for a second and subsequent photographed images of those which have been obtained by continuous photographing.

The image quality correction manager may determine a contrast emphasizing correction of emphasizing the contrast of a subject if the exposure control value is for a subject brightness lower than a predetermined brightness. An exposure control value for the predetermined brightness may be a combination of an aperture value of f5.6 and a shutter speed of 1/60 second. It will be preferable to execute the determination of outline emphasizing correction after the determination of contrast emphasizing correction.

It may be appreciated to provide a first memory operable to store the photographed image read by the image sensor; and a second memory operable to store the image corrected by the image corrector.

The information reader may be provided with a magnetic sensor for reading photographic information magnetically recorded on a film.

Also, the present invention is directed to an image processing apparatus comprising: an image data manager operable to read out data concerning a photographed image; an information data manager operable to read out data concerning photographic information, the photographic information indicative of photographing conditions of the photographed image; an image quality correction manager in responsive to the information data manager and operable to judge based on the read photographic information data necessity of an outline emphasizing correction of emphasizing the outline of a subject; and an image corrector in responsive to the image quality correction manager and operable to apply the outline emphasizing correction to the read photographed image data.

Further, the present invention is directed to an image processing apparatus comprising: an image data manager operable to read out data concerning a photographed image; an information data manager operable to read out data concerning photographic information, the photographic information indicative of photographing conditions of the photographed image; an image quality correction manager in responsive to the information data manager and operable to judge based on the read photographic information data necessity of a contrast emphasizing correction; and an image corrector in responsive to the image quality correction manager and operable to apply the contrast emphasizing correction to the read photographed image data.

The image quality correction manager may determine the contrast emphasizing correction if the photographed image has been obtained under flash light.

Moreover, the present invention is directed to a method for printing an image comprising the steps of: reading photographic information concerning a photographed image on a recording medium by a magnetic reader, the photographic information indicative of photographing conditions of the photographed image; reading the photographed image on the recording medium by an optical image sensor; judging based on the read photographic information whether image quality correction is necessary, and determining a proper image quality correction, if necessary; correcting the read photographed image in accordance with the determined image quality correction; and printing a corrected image on a printing medium.

Accordingly, photographic information, e.g., photographing distance, exposure value, continuous photographing, flash photographing, recorded in correspondence with respective photographed images is read and a specified image quality correction is, if necessary, applied to each photographed image in accordance with its corresponding photographic information. Thus, print images having improved quality can be obtained easily and securely.

These and other objects, features and advantages of the present invention will become more apparent upon a reading of the following detailed description and accompanying drawings.

DETAILED DESCRIPTION OF THE PREFERRED EMBODIMENT OF THE INVENTION

Figure 1:
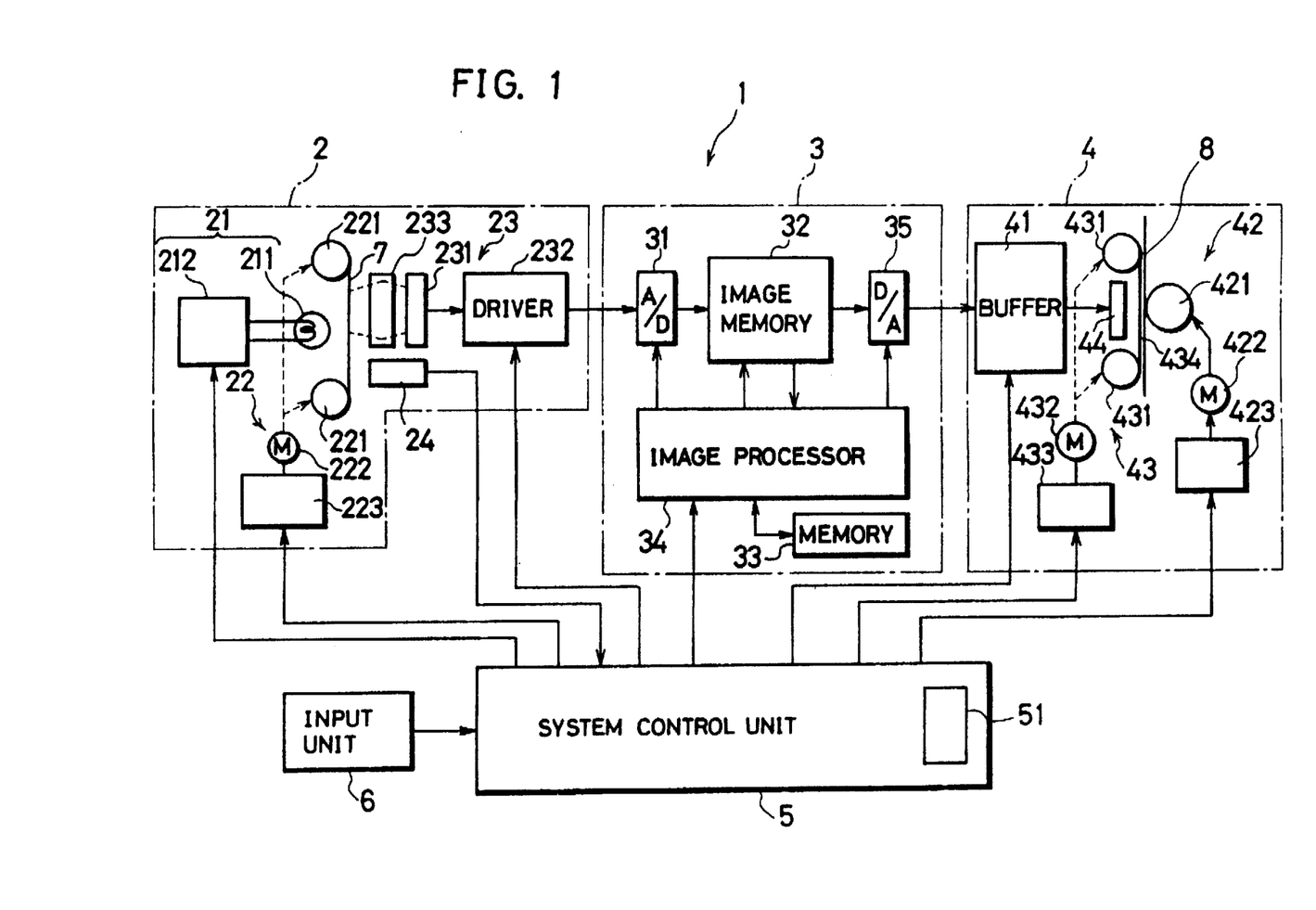
FIG. 1 is a schematic diagram showing an overall construction of a photographed image printing apparatus according to the invention.
Figure 2:
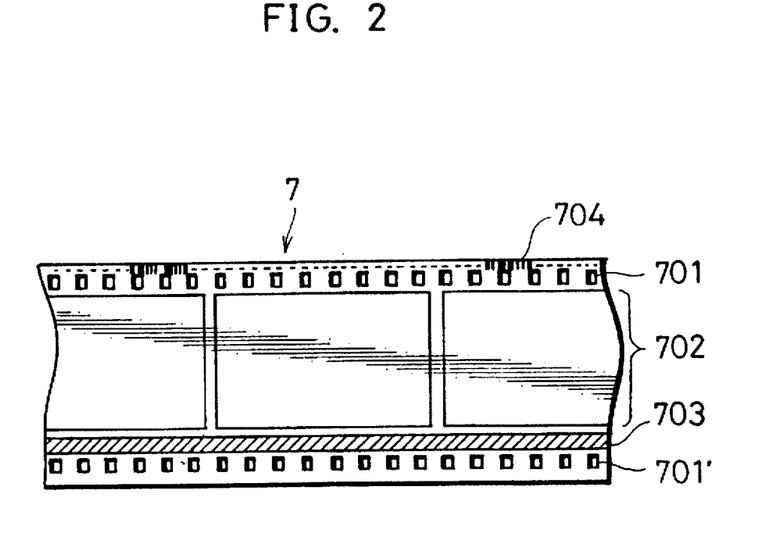
FIG. 2 is a diagram showing a portion of a film.

FIG. 1 is a schematic construction diagram of a photographed image printing apparatus 1 according to the invention as a first embodiment, and FIG. 2 is a diagram showing a film 7 which is used in the printing apparatus 1.

The printing apparatus 1 shown in FIG. 1 reads photographed images recorded on a developed film 7 and prints read photographed images on, for example, a sheet-type printing sheet.

The printing apparatus 1 not only prints a photographed image recorded in each frame of the film 7 on one printing sheet, but also prints a plurality of photographed images on a single printing sheet, so-called an album print. The apparatus 1 is provided with a scanning unit 2, an image processing unit 3, a printing unit 4, a system control unit 5 and an input unit 6.

The scanning unit 2 automatically reads photographed images recorded on the film 7 (hereafter referred to as film images). The image processing unit 3 applies a specified processing to the film images read by the scanning unit 2; temporarily stores the processed images in an image memory 32; and generates image data to be printed (hereafter referred to as print data) from the film images stored in the image memory 32. The printing unit 4 prints the print data generated by the image processing unit 3 on a printing sheet 8. The system control unit 5 centrally controls the operations of the respective units 2 to 4. The input unit 6 is adapted to input a variety of information including the size of the printing sheet 8, the printing direction, the number of printing sheets on which the images are printed, information as to whether or not album print is made, and the type of the film 7 and also to input a variety of commands including start of the printing operation.

The scanning unit 2 includes a light source unit 21, a film feeder 22, an image reader 23 and a photographic information reader 24. The light source unit 21 illuminates the film 7 in the form of a film contained in a cartridge, a rolled film or strip film obtained by cutting the rolled film into strips, so that the film images are projected onto a sensing surface of the image reader 23. The film feeder 22 automatically feeds the film 7 so that the film image are located one after another at a predetermined reading position. The image reader 23 reads the film images. The photographic information reader 24 reads DX codes optically recorded at a predetermined position in vicinity of perforations of the film 7 and a variety of photographic information recorded on a magnetic recording section.

As shown in FIG. 2 perforations 701 and 701' are formed along the upper and bottom ends of the film 7. Between the perforations 701 and 701', there are an image recordable region 702 wherein photographed images are recorded and a magnetic recording section 703 wherein photographic information is recorded in correspondence with the photographed images of the respective frames. A plurality of DX codes in the form of bar codes are repeatedly formed at given intervals at the upper end where the perforations 701 are formed.

The photographic information includes a photographing date, a photographing distance, exposure control values (aperture value and shutter speed), flash firing information, information as to whether or not continuous photographing has been carried out, brightness of a subject, etc.

The magnetic recording section 703 is formed by coating a section of the film 7 below the image recordable region 702 with magnetic paste in a belt-like manner. The section 703 has a predetermined width. The photographic information is magnetically recorded on the section 703 by an information recorder incorporated in a camera during the photographing operation.

The light source unit 21 includes a lamp 211 and a light emission control circuit 212 for controlling the amount of light emitted from the lamp 211. The unit 21 illuminates the film 7 with a predetermined amount of light in accordance with a control signal from the system control unit 5.

The film feeder 22 includes feed rollers 221, a drive motor 222 for driving the feed rollers 221, and a control circuit 223 for controlling the drive motor 222. The feeder 22 feeds the film 7 to locate the frames one after another at the reading position in accordance with the control signal from the system control unit 5.

The image reader 23 includes an area sensor 231 for reading the film image set at the reading position, a driver 232 for controlling the area sensor 231, and an optical system for introducing a light image of the film image on the sensing surface of the area sensor 231. The image reader 23 reads the light images of the respective film images by photoelectrically converting them and outputs image signals representing the film images to the image processing unit 3.

The area sensor 231 includes an area image sensor such as a color CCD (Charge Coupled Device) in which a multitude of pixels including photoelectric conversion elements are arrayed in a matrix of (M, N) and color filters are arranged at the positions of the pixels in a specified pattern. The area sensor 231 may include a CCD of monochromatic type. In this case, three optical color filters of red (R), green (G) and blue (B) and a filter drive circuit for driving the optical filters may be provided between the area sensor 231 and the film 7, so that the film image is picked up by being separated into three color images of R, G and B. Further, a line sensor may be used as a sensing device and the film image may be picked up by moving the line sensor and the film 7 relative to each other.

The driver 232 and the optical system 233 are controlled by the system control unit 5. The information read from the recording section 703 by the photographic information reader 24 is input to the system control unit 5, which then detects the photographic information recorded on this film 7.

The image processing unit 3 includes an Analog-to-Digital (A/D) converter 31, the image memory 32, a memory 33, an image processor 34 and a Digital-to-Analog (D/A) converter 35. The A/D converter 31 converts the analog image signal input from the scanning unit 2 into a digital image signal. The image memory 32 includes a RAM (Random Access Memory) for storing the image signal which is converted into the digital signal by the A/D converter 31 (hereafter referred to as an image data) and the print data. The memory 33 includes a ROM (Read Only Memory) in which a character data is prestored. The image processor 34 applies the specified image processing to the image data and generates the print data. The D/A converter 35 converts the print data generated by the image processor 34 into an analog data and outputs it to the printing unit 4. In accordance with the control signal from the system control unit 5, the image processing unit 3 reads the film image and generates the print data.

The image processing unit 34 converts the character information such as a title which is input by means of the input unit 6 into characters and generates the print data by combining the characters and the print image(s). In the case of the album print, the characters and a plurality of image data stored in the image memory 32 are combined in accordance with a predetermined print format, thereby generating a print data for the album print. If necessary, the image processing unit 34 applies a specified image quality correction to the image data in accordance with the photographic information of each frame read by the photographic information reader 24. The image quality correction will be described in more detail later.

The printing unit 4 includes a buffer 41 for temporarily storing the print data, a sheet feeder 42 for feeding the printing sheet 8, a ribbon feeder 43 for feeding an ink ribbon 434, and a printer head 44 of terminal transfer type. The unit 4 forms an image from the print data output from the image processing unit 3 on the printing sheet 8 such as a paper sheet and an OHP sheet in accordance with the control signal from the system control unit 5.

The printer head 44 includes, for example, a printing head for printing one or several lines. The sheet feeder 42 includes a feed roller 421 for feeding the printing sheet 8, a drive motor 422 for drivingly rotating the feed roller 421, and a motor control circuit 423 for controlling the drive motor 422.

The print data generated by the image processing unit 3 is output to the printing unit 4 in the unit of one or several lines and is temporarily stored in the buffer 41. The printing unit 4 feeds the loaded printing sheet 8 in the form of rolled sheet or cut sheet to the feed roller 421 and feeds the ink ribbon 434 in synchronism with the reading of the print data, and moves the printer head 44 so that the ink ribbon 434 is pressed against the printing sheet 8 to transfer the image represented by the print data on the printing sheet 8. The entire print data is printed on the single printing sheet 8 by alternately repeating the image formation and the feed of the printing sheet 8 in the unit of one or several lines.

The system control unit 5 is provided with a memory 51 including a ROM. Programs for generating the print data in correspondence with the respective print formats are stored in the memory 51.

The printing operation carried out by this printing apparatus 1 is described with reference to flowcharts shown in FIGS. 3 to 5.

Figure 3:
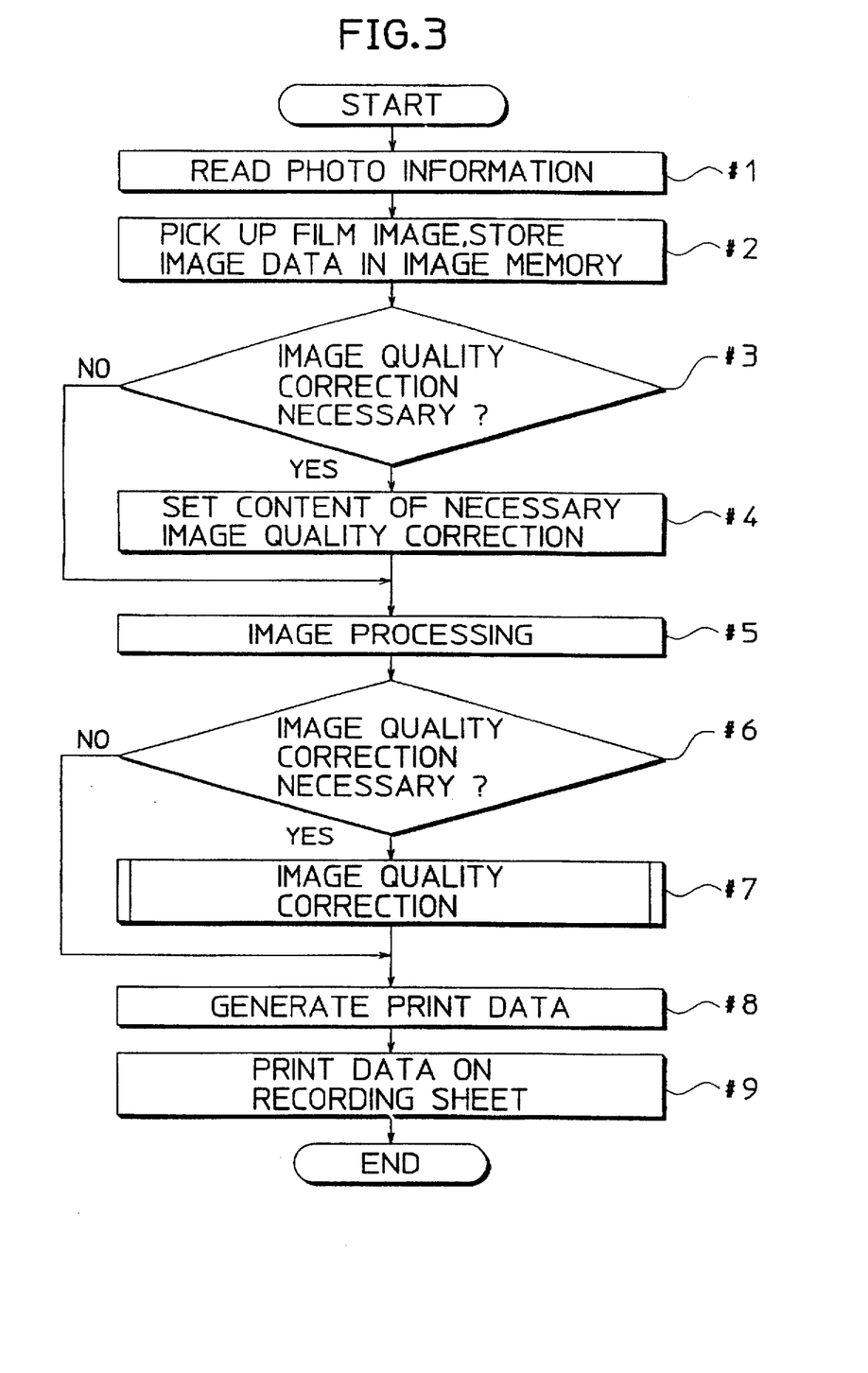
FIG. 3 is a flowchart showing a main routine of a printing operation of the printing apparatus.

FIG. 3 shows a main routine of the printing operation. Specifically, FIG. 3 is a flowchart showing the control executed for the printing operation when the film images are read from the film 7 and printed on the printing sheet.

When the film 7 is loaded in the film feeder 22 and a print start signal is input from the input unit 6, a first frame of the film 7 is fed to the reading position to thereby move the photographic information reader 24 relative to the magnetic recording section 703 of the film 7. As a result, the photographic information corresponding to the first frame is read (Step #1). Subsequently, the film image of the first frame is picked up by the CCD 231 and the image data corresponding to the picked up image is temporarily stored in the image memory 32 (Step #2).

It is then judged based on the photographic information whether any image quality correction is necessary (Step #3). If some image quality correction is necessary (YES in Step #3), the content of a necessary image quality correction is set (Step #4). After a specified image processing such as γ correction and white balance correction (Step #5), it is further judged whether any image quality correction is necessary (Step #6).

If some image quality correction is necessary (YES in Step #6), the set image quality correction is carried out (Step #7) and the print data is generated and stored in the image memory 32 (Step #8).

If no image quality correction is necessary (NO in Step #6), the image data is subject to the image processing without being subject to any image quality correction and the print data is generated and stored in the image memory 32 (Step #8).

The generated print data is output to the printing unit 4 in the unit of one or several lines to be printed on the printing sheet 8 (Step #9). The printing operation ends while the entire print data is printed.

Figure 4:
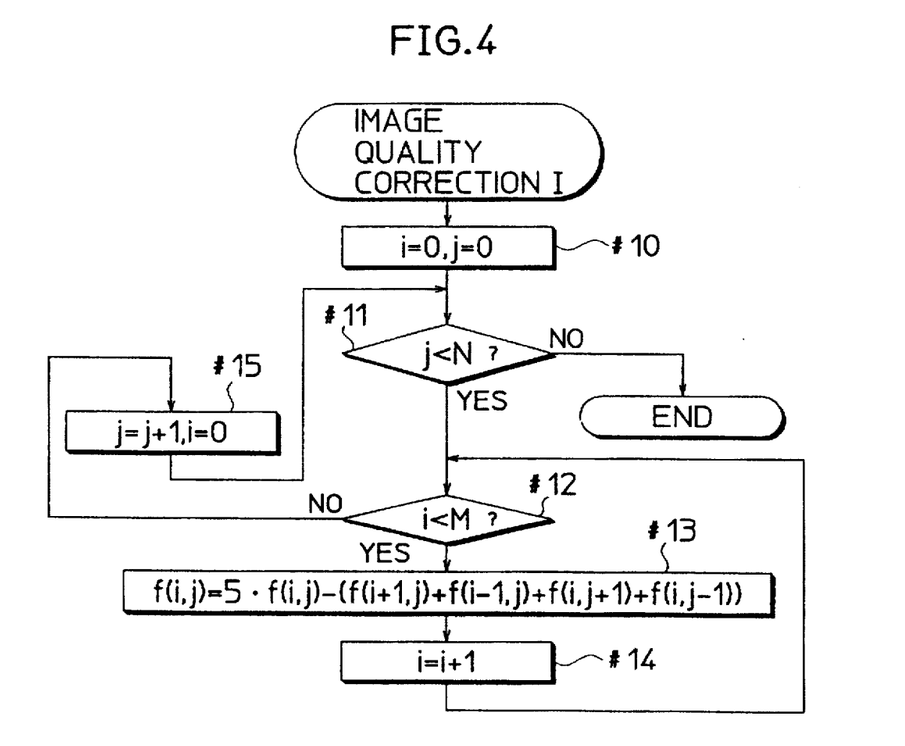
FIG. 4 is a flowchart showing a first "Image Quality Correction" subroutine.

FIG. 4 shows a first "Image Quality Correction" subroutine in which an outline emphasizing correction for emphasizing the outline of the subject is carried out in this subroutine.

Whether or not the outline emphasizing correction is necessary is judged based on the photographing distance information or the information representing whether or not continuous photographing has been carried out. When the judgment is made based on the photographing distance information, the outline emphasizing correction is set as an image quality correction when the photographing distance is longer than a predetermined reference distance, 2 m in this embodiment. This is because the main subject image tends to be relatively sharply focused when the photographing distance is short, whereas it tends to be vaguely focused, causing the unsharpness in the image. This unsharpness is improved by emphasizing the outline of the subject.

It should be appreciated that the reference distance is not limited to 2 m, but may be set at a desired value. Further, the reference distance may be a fixed value or may be switchingly set at one of a plurality of reference distances in connection with the other photographic information. For example, the reference distance may be set in connection with the subject brightness. If the contrast of subject is low, the reference distance is switched to a smaller value, for example, 1.8 m from 2 m because of the likeliness that the image becomes unsharp despite the short photographing distance. As a result, the outline emphasizing correction may be applied to the image photographed at a short distance.

When the judgment is made based on the information as to whether or not continuous photographing has been carried out, the outline emphasizing correction is applied to a second and subsequent images obtained in the continuous photographing, regardless of the distance to the subject. The subject to be photographed in the continuous photographing is normally moving, and it is considered that the second and subsequent images are, in most cases, not sharply in focus. In this way, the unsharpness of the images can be improved by emphasizing the outlines.

In this embodiment, the outline emphasizing correction is applied to the picked up image by a technique of sharpening the image by subtracting a Laplacian-processed function of an image displaying a unsharpness (hereafter referred to as an unsharp image) from a raw function of the unsharp image.

The above technique is designed to reduce the unsharpness of the image by subtracting the Laplacian of the unsharp image therefrom on the assumption that the unsharpness of the image is caused by a diffusing process of the Laplacian of the unsharp image.

If $f(i,j)$ is assumed to be a density data of a pixel (hereafter referred to as a pixel data), the Laplacian $\nabla^2 f(i,j)$ of the digital image composed of the pixel data $f(i,j)$ ($i=1$ to M, $j=1$ to N) is expressed in an approximate expression of the following Equation 1.

Equation 1:

$$\nabla^2 f(i,j) = \{f(i+1,j) + f(i-1,j) + f(i,j+1) + f(i,j-1)\} - 4f(i,j) -$$
$$= 5 [f(i,j) - \{f(i+1,j) + f(i-1,j) + f(i,j) + f(i,j+1) + f(i,j-1)\}/5]$$

Equation 1 shows that the Laplacian $\nabla^2 f(i,j)$ at point $(i,j)$ is expressed as a difference between the density at point $(i,j)$ and an average value of the density at point $(i,j)$ and its four neighboring points $(i+1,j)$, $(i-1,j)$, $(i,j+1)$, $(i,j-1)$ in the horizontal and vertical directions.

The pixel data $f'(i,j)$ composing the digital image free from the unsharpness is calculated from the following Equation 2 using Equation 1.

Equation 2:

$$f'(i,j) = f(i,j) - \nabla^2 f(i,j)$$
$$= 5 \cdot f(i,j) - \{f(i+1,j) + f(i-1,j) + f(i,j+1) + f(i,j-1)\}$$

FIG. 4 is a flowchart showing the operation of applying the calculation of Equation 2 to all M×N pixel data $f(i,j)$.

When this subroutine is called, count values i and j of counters I and J are reset to "0" (Step #10). The counter I is adapted to count the number of rows, and the counter J is adapted to counter the number of columns. It is judged whether the count value j of the counter J has reached N (Step #11). If j≠N (YES in Step #11), it is further judged whether the count value i of the counter I has reached M (Step #12). If i≠M (YES in Step #12), the outline emphasizing correction expressed in Equation 2 is applied (Step #13).

Subsequently, the count value i of the counter I is incremented by one (Step #14) and this subroutine returns to Step #12 to apply the outline emphasizing correction to the next pixel data $f(i,j)$. By repeating a loop of Steps #12 to #14, the outline emphasizing correction to the pixel data $f(i,j)$ for one column is completed. When the count value i of the counter I reaches N (NO in Step #12), the count value i of the counter I is reset to "0" and the count value j of the counter J is incremented by one (Step #15). Thereafter, this subroutine returns to Step #11 to apply the outline emphasizing correction to the pixel data $f(i,j)$ for the next column.

Hereafter, by repeating the loop of Steps #11 to #15, the outline emphasizing correction is applied to the pixel data $f(i,j)$ for each column. When the outline emphasizing correction to the pixel data $f(i,j)$ of all the columns is completed and the count value j of the counter J becomes N (NO in Step #11), this processing is completed upon judgment that the outline emphasizing correction has been applied to all M×N pixel data $f(i,j)$.

Figure 5:
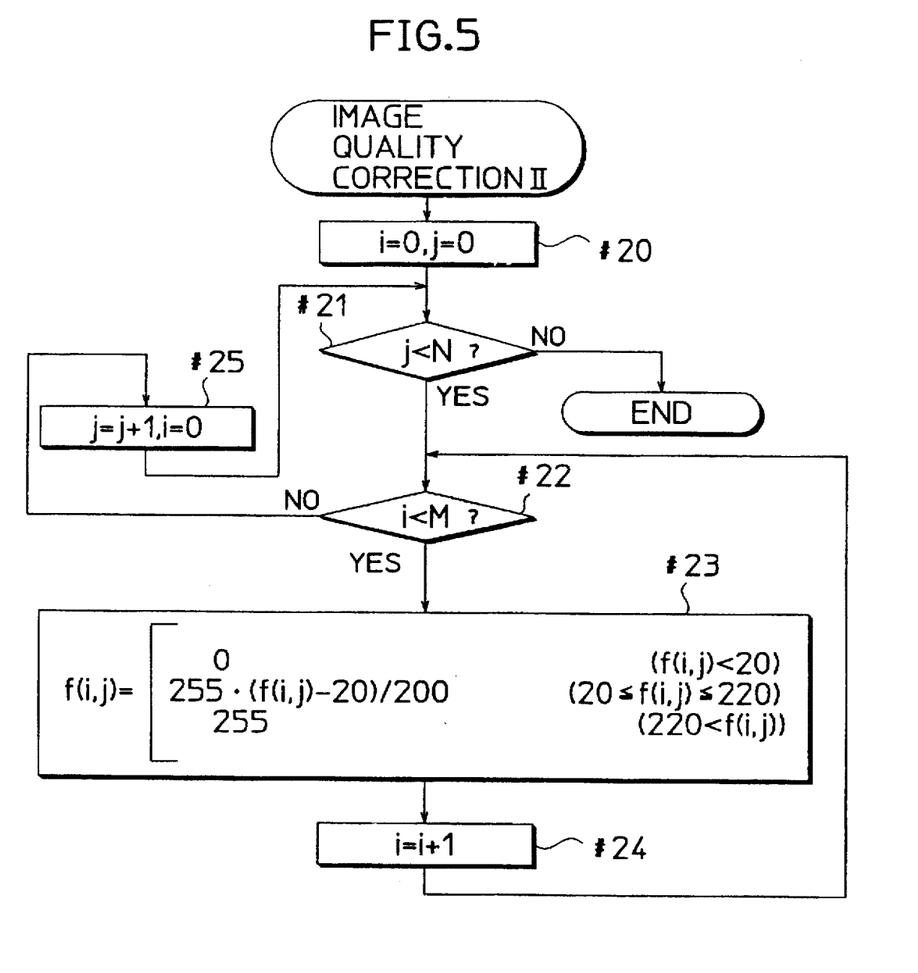
FIG. 5 is a flowchart showing a second "Image Quality Correction" subroutine.

FIG. 5 shows a second "Image Quality Correction" subroutine. Specifically, a contrast emphasizing correction for emphasizing the contrast of subject is carried out in this subroutine.

Whether or not the contrast emphasizing correction is necessary is judged based on whether or not the subject is insufficiently bright. Specifically, the judgment is made based on the exposure control values or the flash firing information. In the case of executing the judgment based on the exposure control value, the contrast emphasizing correction is set as an image quality correction, for example, if the recorded exposure control value is judged to be set for a subject brightness lower than that for which the aperture value is at f5.6 and the shutter speed is at 1/60 second. Reference values of the exposure control values for judging that the subject is insufficiently bright are not limited to the above set values, but may be set at desired values.

In the case of executing the judgment based on the flash firing information, the contrast emphasizing correction is prohibited if the slow synchronizing photographing is judged to be carried out while firing the flash device, or the daylight synchronizing photographing is judged to be carried out, in other words, the subject is judged to be photographed under the natural light and flash light. This is because the flash light is considered to make appropriate the level of the contrast between the subject and the background.

In the film image photographed in the dark, the overall pixel data $f(i,j)$ are considered to concentrate in the intermediate region of the density gradation range. Accordingly, in this case, the contrast emphasizing correction is performed by compressing the opposite ends of the density gradation range of the digital image while expanding the intermediate region thereof. For example, in FIG. 6, a density conversion characteristic I is changed to a density conversion characteristic II.

FIG. 5 is a flowchart showing the operation of applying the contrast emphasizing correction. FIG. 5 exemplifies the operation of converting the respective pixel data f(i,j) by the density conversion characteristic II of FIG. 6. If it is assumed that the pixel data after the density conversion are f(i,j), the pixel data f'(i,j) are expressed in the following Equation 3.

Equation 3:

$$f'(i,j) = \begin{cases} (i) & 0 & (f(i,j) < 20) \\ (ii) & 255 \cdot (f(i,j) - 20)/200 & (20 \leq f(i,j) \leq 220) \\ (iii) & 255 & (220 < f(i,j)) \end{cases}$$

Equation 3 denotes: f'(i,j) is compressed to "0" when f(i,j)<20, compressed to "255" when 220<f(i,j), and expanded to $0 \leq f'(i,j) \leq 255$ when $20 \leq f(i,j) \leq 220$.

The flowchart shown in FIG. 5 differs from the one shown in FIG. 4 only in that the operation content in Step #14 is replaced by Equation 3. Accordingly, Steps #20 to #25 correspond to Steps #10 to #15, respectively. Since the procedure of the operation applied to the respective pixel data f(i,j) is quite similar to the outline emphasizing correction, no description is given here.

The above contrast emphasizing correction is performed when the subject is insufficiently bright. It is also preferable to perform the contrast emphasizing correction when the brightness range of the film image is beyond the dynamic range of the CCD 41. This is because, in this case, the bright and dark regions of the film image are compressed to the upper and lower levels of the dynamic range of the CCD41, respectively and therefore the film image cannot be accurately reproduced.

In the case where the camera is provided with a multiple light measuring function and the maximum and minimum brightness values are recordable as photographic information, it is judged based on this brightness information whether or not the contrast emphasizing correction is necessary. A specified contrast emphasizing correction is set when the judgment result is in the affirmative.

Specifically, the above judgment is made, for example, by comparing the brightness difference between the maximum and minimum brightness values with a predetermined reference value. If the brightness difference is not smaller than the reference value, a specified contrast emphasizing correction is performed.

The content of this contrast emphasizing correction is to emphasize the contrast in the brightest and darkest regions of the brightness range of the film image to thereby improve the image quality in these regions. Thus, the high and low density regions are expanded, whereas the intermediate density region is compressed.

Figure 6:
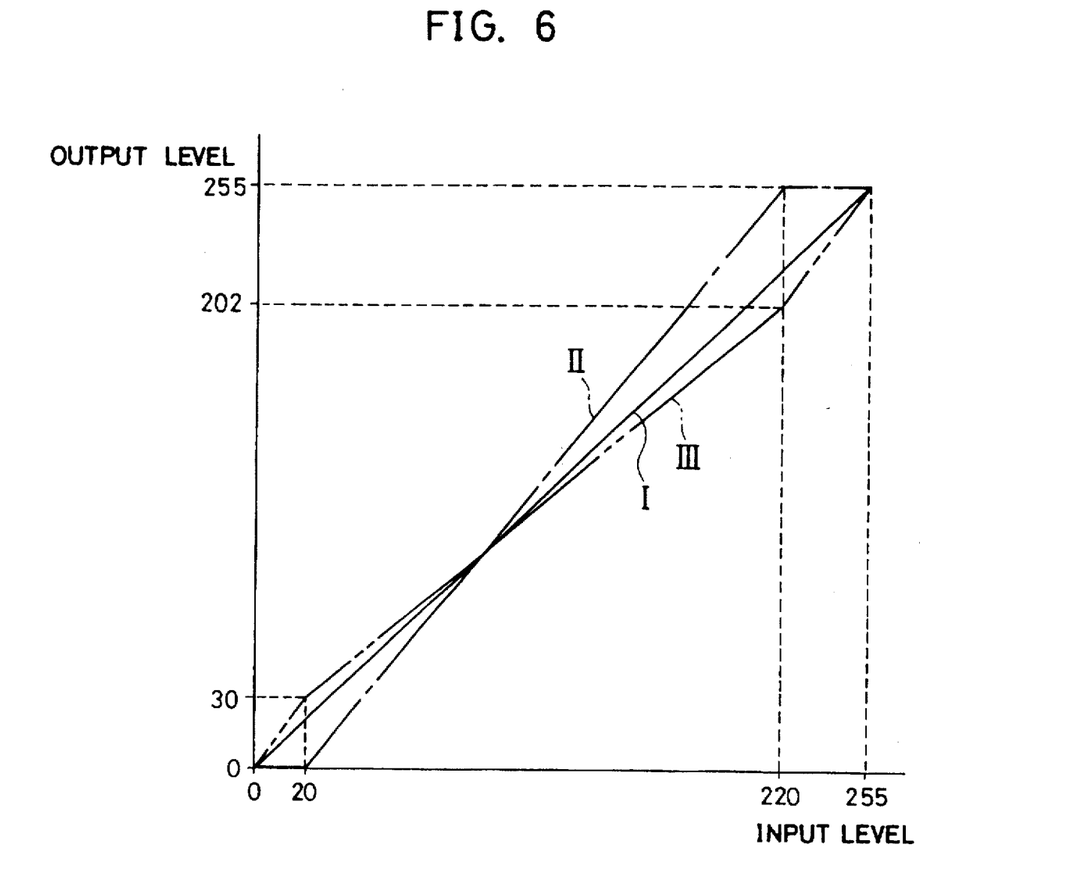
FIG. 6 is a graph showing density conversion characteristics.

For example, in FIG. 6, the density conversion characteristic I is changed to a density conversion characteristic III. The pixel data f'(i,j) after the density conversion by the density conversion characteristic III are expressed in the following Equation 4.

Equation 4:

$$f'(i,j) = \begin{cases} (i) & 30 \cdot f(i,j)/20 & (f(i,j) < 20) \\ (ii) & (202 - 30) \cdot (f(i,j) - 20)/(200 - 20) + 30 & (20 \leq f(i,j) \leq 220) \\ (iii) & (255 - 202) \cdot (f(i,j) - 220)/(255 - 220) + 202 & (220 < f(i,j)) \end{cases}$$

Equation 4 denotes: the density range is expanded by 1.5(30/20, (255−202)/(255−220)) when f(i,j)<20 or 220<f(i, j) and is compressed by 0.86((202−30)/(200−20)) when $20 \leq f(i,j) \leq 220$.

In the foregoing embodiment, the density gradation range is divided into three regions: bright region, dark region and intermediate region, by boundary values of 20 and 220. These boundary values are not limited to the above, but may be set at desired values.

Figure 7:
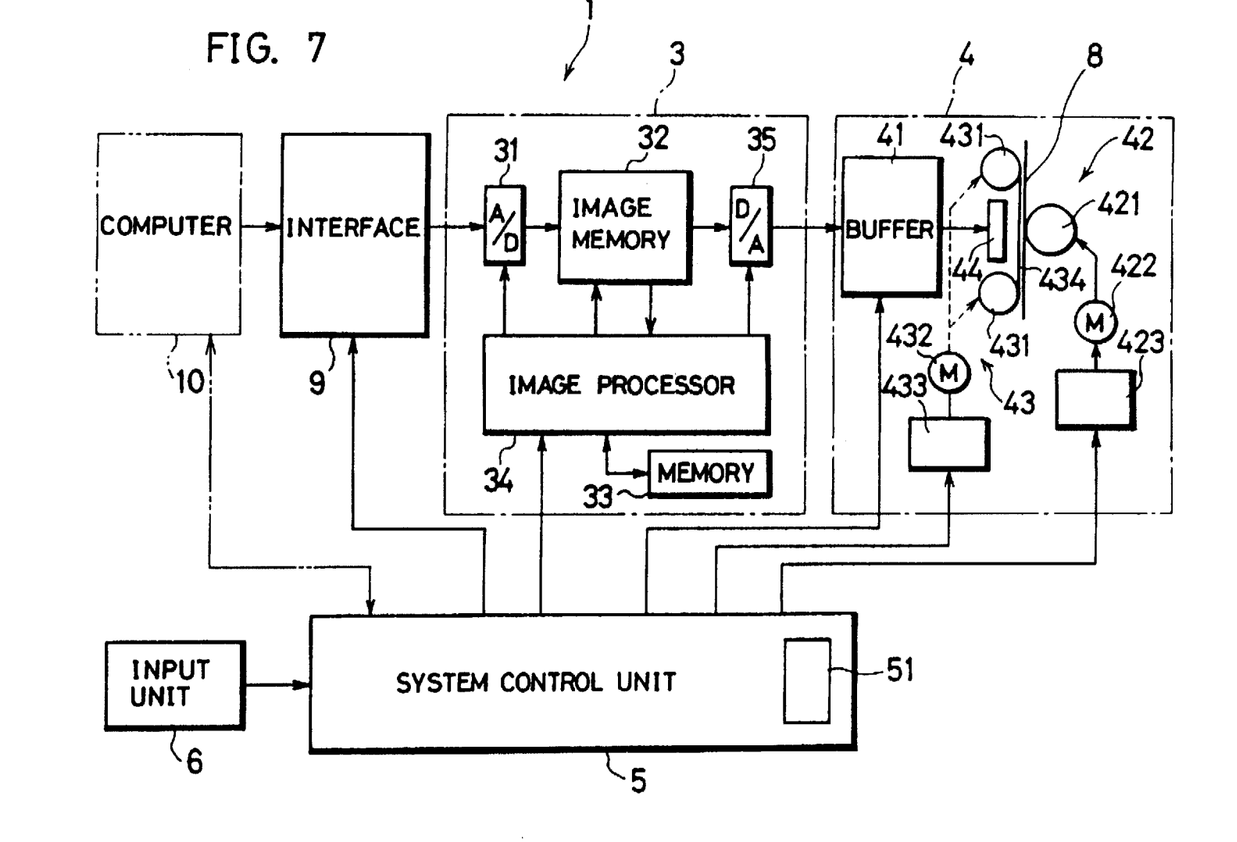
FIG. 7 is a schematic diagram showing an overall construction of another photographed image printing apparatus according to the invention.

FIG. 7 is a schematic construction diagram showing a printing apparatus according to the invention as a second embodiment.

In FIG. 7, an interface 9 for inputting data is provided in place of the scanning unit 2 in FIG. 1. A computer 10, an image scanner, or like image data output apparatus is connectable with the interface 9.

In the second embodiment, the quality of the print image is improved by applying a specified image quality correction to the film image read by means of the image scanner or input by way of the computer 10 in accordance with the photographic information.

In the second embodiment, the film image and photographing data are input through the communication with the computer 10 or the like. Since the image processing and printing carried out after receipt of the film image and photographing data in the printing apparatus 1 is same as in the first embodiment, no description is given here.

The foregoing embodiments have been described with respect to the image quality correction performed when the film images are printed one by one or a plurality of film images are printed in an album style. However, the image quality correction can be also applied when all the film images are displayed as index references in a suitable arrayed pattern.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. An image processing apparatus comprising:

an image sensor operable to optically read an image on a recording medium and to output an electrical signal representative of the read image;

an information reader operable to read information on the recording medium that is indicative of conditions of the image on the recording medium;

an image quality correction manager responsive to the information reader and operable to judge based on the read information whether image quality correction is necessary, and determine a proper image quality correction, if necessary; and an image corrector responsive to the image quality correction manager and operable to correct the read image by processing the electrical signal in accordance with the determined image quality correction.

2. An image processing apparatus as defined in claim 1, wherein the information includes a distance to a subject, the image quality correction manager determines an outline emphasizing correction of emphasizing the outline of the subject if the distance is judged to be greater than a predetermined distance.

3. An image processing apparatus as defined in claim 2, wherein the predetermined distance is two meters.

4. An image processing apparatus as defined in claim 2, wherein the information further includes an exposure control value, and the predetermined distance is set at a shorter distance when the exposure control value is for a lower subject brightness.

5. An image processing apparatus as defined in claim 2, wherein the outline emphasizing correction is executed by means of Laplacian calculation.

6. An image processing apparatus as defined in claim 1, wherein:
the information includes information concerning continuous image recording; and
the image quality correction manager judges based on the continuous image recording information whether the images are recorded continuously, and determines an outline emphasizing correction for emphasizing the outline of a subject for a second and subsequent recorded images of those which are judged to have been recorded continuously.

7. An image processing apparatus as defined in claim 1, wherein:
the information includes an exposure control value; and
the image quality correction manager determines a contrast emphasizing correction for emphasizing the contrast of a subject if the exposure control value is judged to be for a subject brightness lower than a predetermined brightness.

8. An image processing apparatus as defined in claim 7, wherein an exposure control value for the predetermined brightness is a combination of an aperture value of f5.6 and a shutter speed of 1/60 second.

9. An image processing apparatus as defined in claim 7, wherein the image quality correction manager further determines based on an exposure control value an outline emphasizing correction of emphasizing the outline of a subject, the determination of outline emphasizing correction being executed after the determination of contrast emphasizing correction.

10. An image processing apparatus as defined in claim 1, further comprising:
a first memory operable to store the image read by the image sensor; and
a second memory operable to store the image corrected by the image corrector.

11. An image processing apparatus as defined in claim 1, wherein:
the information is magnetically recorded on the recording medium; and
the information reader includes a magnetic sensor for reading the magnetically recorded information.

12. An image processing apparatus as defined in claim 1, further comprising a printer operable to print a corrected image on a printing medium.

13. An image processing apparatus as defined in claim 1, wherein said image sensor reads a photographed image optically recorded on a film and said information reader reads photographic information magnetically recorded on the film.

14. An image processing apparatus comprising:
an image data manager operable to read data concerning a recorded image;
an information data manager operable to read information data concerning information indicative of conditions of the recorded image;
an image quality correction manager responsive to the information data manager and operable to judge based on the read information data whether outline emphasizing correction for emphasizing the outline of a subject is necessary; and
an image corrector responsive to the image quality correction manager and operable to emphasize the outline of the subject by processing the read data electrically.

15. An image processing apparatus as defined in claim 14, wherein the information data includes data concerning a distance to a subject, and the image quality correction manager determines the outline emphasizing correction if the distance is judged to be greater than a predetermined distance.

16. An image processing apparatus as defined in claim 15, wherein the predetermined distance is two meters.

17. An image processing apparatus as defined in claim 15, wherein the information data further includes data concerning an exposure control value, and the predetermined distance is set at a shorter distance when the exposure control value is for a lower subject brightness.

18. An image processing apparatus as defined in claim 15, wherein the outline emphasizing correction is executed by means of Laplacian calculation.

19. An image processing apparatus as defined in claim 14, wherein:
the information data includes data concerning continuous image recording; and
the image quality correction manager judges based on the continuous image recording data whether the images are recorded continuously, and determines the outline emphasizing correction for a second and subsequent recorded images of those which are judged to have been recorded continuously.

20. An image processing apparatus as defined in claim 14, further comprising:
an image sensor operable to optically read a photographed image on a film and produce photograph image data;
a memory operable to store the photograph image data;
wherein the information data manager is operable to read out the photograph image data from the memory.

21. An image processing apparatus as defined in claim 20, wherein:
the information data is magnetically recorded on the film; and
the information data manager includes a magnetic sensor for reading the magnetically recorded information data.

22. An image processing apparatus as defined in claim 14, further comprising a printer operable to print an image based on image data corrected by said image corrector.

23. An image processing apparatus comprising:
an image data manager operable to read data concerning a recorded image;
an information data manager operable to read information data concerning information indicative of conditions of the recorded image;
an image quality correction manager responsive to the information data manager and operable to judge based on the read information data whether a contrast emphasizing correction is necessary; and an image corrector responsive to the image quality correction manager and operable to emphasize the contrast of a subject by processing the read image data electrically.

24. An image processing apparatus as defined in claim 23, wherein the information data includes data concerning an exposure control value, the image quality correction manager determines a contrast emphasizing correction if the exposure control value is judged to be for a subject brightness lower than a predetermined brightness.

25. An image processing apparatus as defined in claim 24, wherein an exposure control value for the predetermined brightness is a combination of an aperture value of f5.6 and a shutter speed of 1/60 second.

26. An image processing apparatus as defined in claim 23, wherein:
   the information data further includes data concerning whether the recorded image was obtained under a flash light condition; and
   the image quality correction manager determines the contrast emphasizing correction if the recorded image is judged to have been obtained under a flash light condition.

27. An image processing apparatus as defined in claim 23, wherein:
   the information data further includes data concerning a shutter speed; and
   the image quality correction manager determines the contrast emphasizing correction if the shutter speed is judged to be greater than a predetermined speed.

28. An image processing apparatus as defined in claim 23, further comprising:
   an image sensor operable to optically read a photographed image on a film and produce photograph image data;
   a memory operable to store the photograph image data; and
   wherein the information data manager is operable to read out the photograph image data from the memory.

29. An image processing apparatus as defined in claim 23, further comprising a printer operable to print an image based on the image data corrected by said image corrector.

30. A method for processing an image comprising the steps of:
   reading information concerning an image recorded on a recording medium by a magnetic reader, the information being indicative of conditions of the recorded image;
   reading the image recorded on the recording medium by an optical image sensor;
   outputting an electrical signal representative of the image read by the optical image sensor;
   judging based on the read information whether image quality correction is necessary, and determining a proper image quality correction, if necessary; and
   correcting the read image by processing the electrical signal in accordance with the determined image quality correction.

31. A method for processing an image as defined in claim 30, further comprising the step of printing a corrected image on a printing medium.

32. An image processing apparatus comprising:
   image sensing means for reading an image recorded on a recording medium;
   information reading means for reading information recorded on the recording medium, the information being indicative of conditions of the image on the recording medium;
   judging means for judging whether image quality correction is necessary and determining a proper image quality correction, if necessary, based on the read information; and
   image correcting means for correcting the image recorded on the recording medium in accordance with the determined image quality correction.

* * * * *